(12) United States Patent
Furuta et al.

(10) Patent No.: US 6,902,015 B2
(45) Date of Patent: Jun. 7, 2005

(54) TWO-LEG WALKING HUMANOID ROBOT

(75) Inventors: Takayuki Furuta, Tokyo (JP); Ken Tomiyama, Tachikawa (JP); Hiroaki Kitano, Kawagoe (JP)

(73) Assignee: Japan Science and Technology Agency, Kawaguchi (JP)

( * ) Notice: Subject to any disclaimer, the term of this patent is extended or adjusted under 35 U.S.C. 154(b) by 8 days.

(21) Appl. No.: 10/466,316

(22) PCT Filed: Jun. 3, 2002

(86) PCT No.: PCT/JP02/05423

§ 371 (c)(1),
(2), (4) Date: Jul. 28, 2003

(87) PCT Pub. No.: WO02/100607

PCT Pub. Date: Dec. 19, 2002

(65) Prior Publication Data

US 2004/0060746 A1 Apr. 1, 2004

(30) Foreign Application Priority Data

Jun. 7, 2001 (JP) ........................................ 2001-173263

(51) Int. Cl.[7] .............................................. B62D 51/06
(52) U.S. Cl. ........................................... 180/8.6; 901/8
(58) Field of Search ................................... 180/8.1, 8.6

(56) References Cited

U.S. PATENT DOCUMENTS

| | | | | |
|---|---|---|---|---|
| 4,709,342 A | * | 11/1987 | Hosoda et al. .............. | 702/138 |
| 5,151,859 A | * | 9/1992 | Yoshino et al. ............... | 701/23 |
| 5,255,753 A | * | 10/1993 | Nishikawa et al. ........... | 180/8.6 |
| 5,402,050 A | * | 3/1995 | Ozawa ................... | 318/568.12 |
| 6,064,167 A | * | 5/2000 | Takenaka et al. ...... | 318/568.12 |
| 6,430,475 B2 | * | 8/2002 | Okamoto et al. .......... | 700/245 |
| 6,463,356 B1 | * | 10/2002 | Hattori et al. .............. | 700/245 |
| 6,538,410 B2 | * | 3/2003 | Mori et al. ............ | 318/568.12 |
| 6,732,015 B2 | * | 5/2004 | Maeda ........................ | 700/245 |
| 2004/0133308 A1 | * | 7/2004 | Kato et al. ................... | 700/245 |

OTHER PUBLICATIONS

Patent Abstracts of Japan, Publication No. 2001-239479, dated Sep. 4, 2001. Cited in the int'l. search report.
Patent Abstracts of Japan, Publication No. 2001-138271, dated May 22, 2001. Cited in the int'l. search report.
Patent Abstracts of Japan, Publication No. 06-278081, dated Oct. 4, 1994. Cited in the int'l. search report.
Takayuki Furuta et al.; The Japan Society of Mechanical Engineers Robotics, 2A1.N3.(1)—2A1.N3(2). Cited in the int'l. search report.

* cited by examiner

Primary Examiner—Paul N. Dickson
Assistant Examiner—Paul Royal, Jr.
(74) Attorney, Agent, or Firm—Westerman, Hattori, Daniels & Adrian, LLP (57) ABSTRACT

A biped walking humanoid robot is disclosed having an arrangement whereby shocks acting on various parts of the robot when it falls can be relieved and its state of fall can then be detected. The robot has a body (11) capable of bending forward, a pair of legs (12L, 12R) attached to a lower part of the body at a pair of opposite sides thereof, respectively, a pair of arms (13L, 13R) attached to an upper part of the body at a pair of opposite sides, respectively, and a head (14) attached to an upper end of the body, each of the legs having a upper leg (15L, 15R) attached to the body so as to be pivotally movable relative thereto triaxially, a lower leg (16L, 16R) attached to a lower end of the upper leg so as to be pivotally movable relative thereto monoaxially and a foot (17L, 17R) attached to a lower end of the lower leg so as to be pivotally movable relative thereto biaxially, each of the arms having an upper arm (25L, 25R) attached to the body so as to be pivotally movable relative thereto biaxially, a lower arm (26L, 26R) attached to the upper arm so as to be pivotally movable relative thereto monoaxially and a hand (27L, 27R) attached to the lower hand so as to be pivotally movable relative thereto biaxially, the robot also having drive means (23L, 23R, 24L, 24R; 21L, 21R; 19L, 19R, 20L, 20R, 18L, 18R; ...) associated with the feet, the lower legs and the upper legs of the legs, the hands, the lower arms and the upper arms of the arms and a body bending-forward region for pivotally moving them, respectively, a control stage (51) for controlling driving actions of the drive means, and a contact detector (40) mounted at each of an outer elbow surface area formed between the upper and lower arms, and an outer wrist surface area between the lower arm and the hand of each of the arms, and a lower toe surface area of the foot, a lower heal surface area of the foot, an outer knee surface area between the upper and lower legs of each of the legs, and a hip surface area and a back surface area of the body, the contact detector at each of these surface areas comprising a casing portion (41) made of a material forming an outer covering surface area of the robot, a pressure sensor (42) for sensing a pressure acting on the casing portion and a shock absorbing material (43) for absorbing a shock acting on the casing portion. Thus, when the biped walking humanoid robot is having a fall, the state or type of this fall can be determined by the control stage in response to a contact signal detected by the pressure sensor in the contact detector at a relevant part of the abovementioned robot parts which is brought into contact with the floor or ground. Then, on the basis of the type of the fall determined, the control stage is allowed to act on the drive means to move the arm and leg parts suitably so as to cause the robot to take a corrective falling action to have a safety fall and then to move to taking a rising action to get up on its feet.

10 Claims, 9 Drawing Sheets

TWO-LEG WALKING HUMANOID ROBOT

TECHNICAL FIELD

The present invention relates to a biped (two-footed) walking humanoid robot and, in particular, to a biped walking humanoid robot which is so designed that shocks acting on various parts of the robot when it falls can be relieved and its state or type of fall can then be detected.

BACKGROUND ART

A biped walking robot as it is called in the art has so far been made able to walk with two legs by producing in advance data for a pre-established walking pattern (hereinafter referred to as "gait") and actuating the legs in a controlled manner in accordance with the gait data so that the robot can bipedally walk as desired.

Such a conventional biped walking robot tends to become unstable in walking position due, for example, to floor or ground surface conditions and an error in the physical parameters of the robot itself and may then even turn over or fall violently.

However, while conventional biped walking humanoid robots are designed to fall as little as possible, they have never been designed so they when falling down take a safety way of falling down or then to scramble on their feet. To wit, no biped walking humanoid robot has been built having the capability of relieving shocks acting on its parts or the capability of detecting a particular state that it is falling. Further, if the conventional biped humanoid robot that fell down should be allowed to rise on its feet, the fact that the outer covering surface areas of its trunk body, legs and arms are desirably formed of relatively flat surfaces makes it hard to have the robot take successive actions dynamically and with smoothness for it to rise. This problem also applies if the conventional biped humanoid should be allowed to make a forward roll.

It is accordingly an object of the present invention to provide a biped walking humanoid robot having the capability of relieving shocks acting on its various parts when it falls violently and also the capability of detecting a particular state that it is falling.

DISCLOSURE OF THE INVENTION

In order to attain the object mentioned above, there is provided in accordance with the present invention a biped walking humanoid robot, which includes a body portion having an upper and a lower part, a pair of leg portions attached to the lower part of the body portion at a pair of its opposite sides, respectively, a pair of arm portions attached to the upper part of the body portion at a pair of its opposite sides, respectively, and a head portion attached to an upper end of the upper part of the body portion, wherein each of the leg portions includes tow upper leg portions attached to the lower part of the body portion so as to be pivotally movable relative thereto triaxially, a lower leg portion attached to the upper leg portion so as to be pivotally movable relative thereto monoaxially, and a foot portion attached to the lower leg portion so as to be pivotally movable relative thereto biaxially, wherein each of the arm portions includes two upper arm portions attached to the upper part of the body portion so as to be pivotally movable relative thereto biaxially, a lower arm portion attached to the upper arm portion so as to be pivotally movable relative thereto monoaxially, and a hand portion attached to the lower arm portion so as to be pivotally movable relative thereto biaxially, wherein the body portion has an intermediate, anteflex region at which it is made able to bend forward; and wherein the robot further comprises a drive means for pivotally moving each of the foot portion, the lower leg portion and the upper leg portion of each of the leg portions, and the hand portion, the lower arm portion and the upper arm portion of each of the arm portions, and the body portion at the anteflex region, and a control means for controlling driving actions of the drive means; the robot being characterized in that there is provided a contact detector at each of an outer area of an elbow portion formed between the upper and lower arm portions, and an outer area of a wrist portion formed between the lower arm portion and the hand portion of each of the said arm portions, and a lower side of a toe portion formed in the foot portion, a lower side of a heel portion formed in the foot portion, and an outer area of a knee portion formed between the upper and lower leg portions of each of the said leg portions, and a hip region and a back region of said body portion, and that the said contact detector comprises a casing portion forming an outer covering surface of the robot at the said contact detector, a pressure sensor for sensing a pressure acting on the said casing portion and an impact absorbing material for relieving a shock acting on the said casing portion.

A biped walking humanoid robot according to the present invention is preferably so configured in each of such contact detectors that the said pressure sensor and the said impact absorbing material are integrally formed and more preferably that the said casing portion, the said pressure sensor and the said impact absorbing material are formed integrally. A biped walking humanoid robot according to the present invention is also preferably so configured in each of such contact detectors that the said casing portion lies at an outermost side thereof, or that the said pressure sensor lies at an outermost side thereof, or that the said impact absorbing material lies at an outermost side thereof.

A biped walking humanoid robot according to the present invention is preferably so configured that each of the aid body portion, the upper and lower arm portions of the said arm portions, and the upper and lower leg portions of the said leg portions has a curved outer covering surface that is convex in contour.

A biped walking humanoid robot according to the present invention is preferably so configured that for each of the said leg portions, the said foot portion is made pivotally movable relative to the said lower leg portion in a pitch direction in a range of angles from −20 to +20 degrees or more, the said lower leg portion is made pivotally movable relative to the said upper leg portion in a pitch direction in an range of angles from 0 to +60 degrees or more, and the said upper leg portion is made pivotally movable relative to said body portion in a pitch direction in a range of angles from 0 to +45 degrees or more, and the said body portion is made able to bend forward in a range of angles from 0 to +30 degrees or more.

A biped walking humanoid robot according to the present invention is preferably so configured that those of the said drive means for pivotally moving the foot portion, the lower leg portion and the upper leg portion of each of the said leg portions, respectively, are disposed inclined to one another so as not to hinder pivotal movements of the said foot portion, the said upper portion and the said lower leg portions.

With a biped walking humanoid robot constructed as mentioned above, namely so that a contact detector having an impact absorbing material is disposed at each of those parts of the robot which can hit on the floor or ground when the robot is falling down to or rolling over it, that is, at each of an outer area of an elbow portion formed between the upper and lower arm portions, and an outer area of a wrist portion formed between the lower arm portion and the hand portion of each of the arm portions, and a lower side of a toe portion formed in the foot portion, a lower side of a heel portion formed in the foot portion, and an outer area of a knee portion formed between the upper and lower leg portions of each of the said leg portions, and a hip region and a back region of the body portion, any shock acting on any of these parts hitting on the floor or ground can be absorbed by the impact absorbing material. With the shock against the internal structure of each of these parts so alleviated, they are protected from any possible damage that should otherwise be the case when the biped walking humanoid robot happens to fall to or is attempting to perform a rolling action over the floor or ground.

And, when the biped walking humanoid robot is having a fall, the state or type of this fall can be determined by the control means in response to a contact signal detected by the pressure sensor in the contact detector at a relevant part of the abovementioned robot parts which is brought into contact with the floor or ground. Then, on the basis of the type of the fall determined, the control means is allowed to act on the drive means to move the arm and leg parts suitably so as to cause the robot to take a corrective falling action to have a safety fall and then to move to taking a rising action to get up on its feet.

Forming integrally the pressure sensor and the impact absorbing material, or the casing portion, the pressure sensor and the impact absorbing material, in each of the contact detectors allows each contact detector to be simplified in makeup and to be readily assembled.

In each contact detector, disposing the casing portion at the outermost side is advantageous in that when the biped walking humanoid robot falls to cause the contact detector to hit on the floor or ground, the casing comes into direct contact with the floor or ground, thereby protecting the pressure sensor, the impact resistant material and further the inner structure of the robot from the shock.

In each contact detector, disposing the pressure sensor at the outermost side is advantageous in that when the biped walking humanoid robot falls, the pressure sensor comes into direct contact with the floor or ground, thereby making most certain of sensing the pressure contact of the contact detector with the floor or ground.

In each contact detector, disposing the impact absorbing material at the innermost side is advantageous in that when the biped walking humanoid robot falls to cause the contact detector to hit on the floor or ground, the impact absorbing material comes into direct contact with the floor or ground, thereby making for most certain of absorbing the shock.

Making each of the body portion, the upper and lower arms of the arm portions, and the upper and lower leg portions of the leg portions of a curved outer covering surface that is convex in contour allows the biped humanoid robot in its rising action from the state of a fall to smoothly rise with the aid of such curved outer covering surfaces in contact with the floor or ground.

If for each of the said leg portions, the foot portion is made pivotally movable relative to the lower leg portion in a pitch direction in a range of angles between −20 and +20 degrees, the lower leg portion is made pivotally movable relative to the upper leg portion in a pitch direction in an range of angles between 0 and +60 degrees, and the upper leg portion is made pivotally movable relative to body portion in a pitch direction in a range of angles between 0 and +45 degrees, and the body portion is made able to bend forward in a range of angles between 0 and +30 degrees, the biped humanoid robot in its rising action of the state of a fall is allowed to rise for certain by virtue of these angular ranges of movements given.

If those of the drive means for pivotally moving the foot portion, the lower leg portion and the upper leg portion of each of the leg portions are disposed inclined to one another so as not to hinder pivotal movements of the foot portion, the upper leg portion and the lower leg portion, the biped humanoid robot in its rising action from the state of a fall is allowed to rise for certain by virtue of the fact that the foot portion, the lower leg portion and the upper leg portion of each of the leg portions are prevented in their respective pivotal movements from interfering with one another.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof. In the drawings:

FIG. 1 shows an external appearance of a biped walking humanoid robot according to the present invention as one form of embodiment thereof, wherein FIG. 1A and FIG. 1B are a schematic front and a schematic side elevation view thereof, respectively;

FIG. 6 shows a preferred layout of joint drive motors for each of the legs of the biped walking humanoid robot shown in FIG. 1, wherein FIGS. 6A and 6B are schematic diagrams illustrating their positions taken when the robot stands upright and has pivotal movements produced thereby, respectively;

BEST MODES FOR CARRYING OUT THE INVENTION

Hereinafter, the present invention will be described in detail with reference to suitable forms of embodiment thereof illustrated in the drawing figures.

Figure 1:
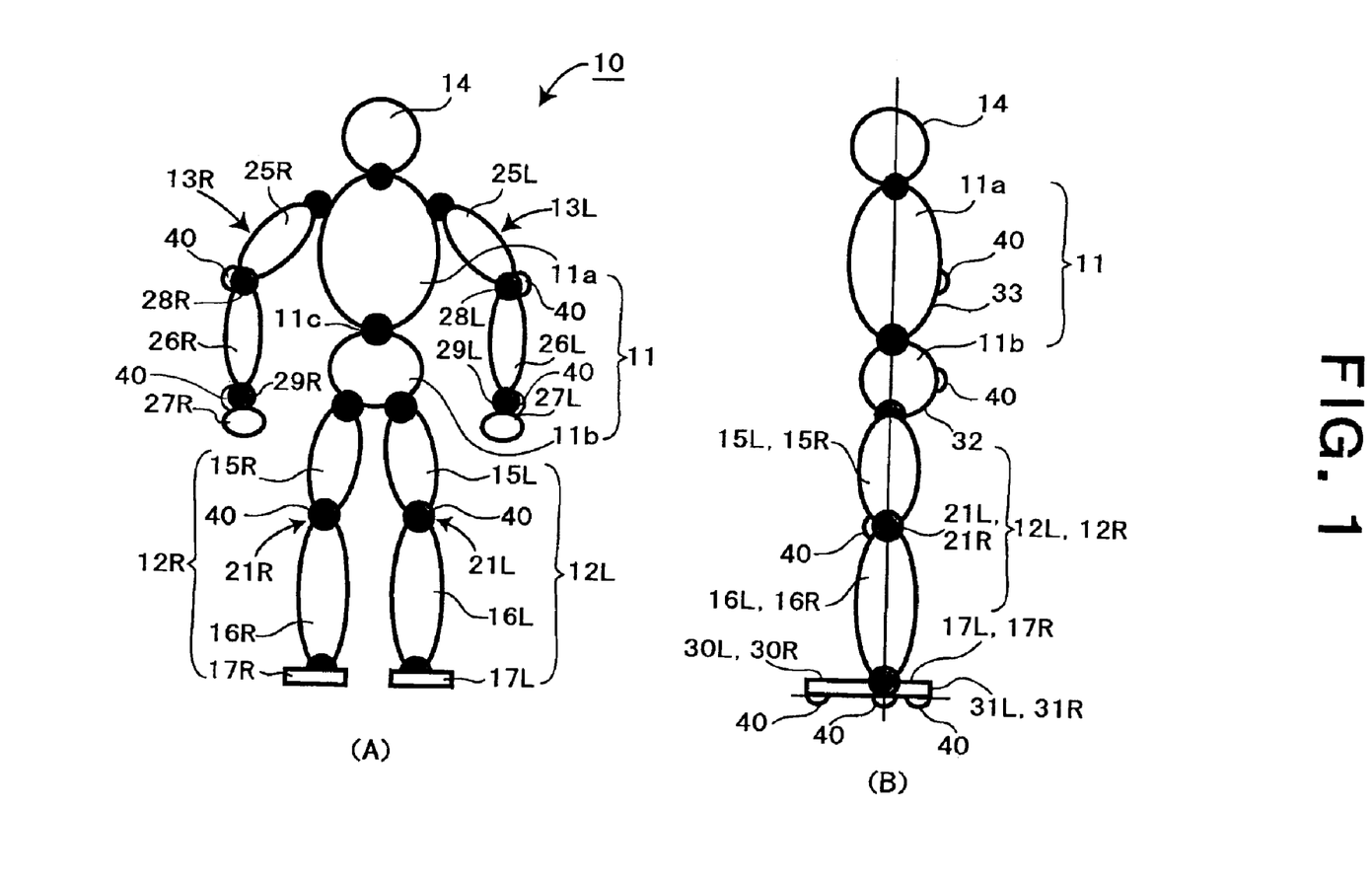
Figure 2:
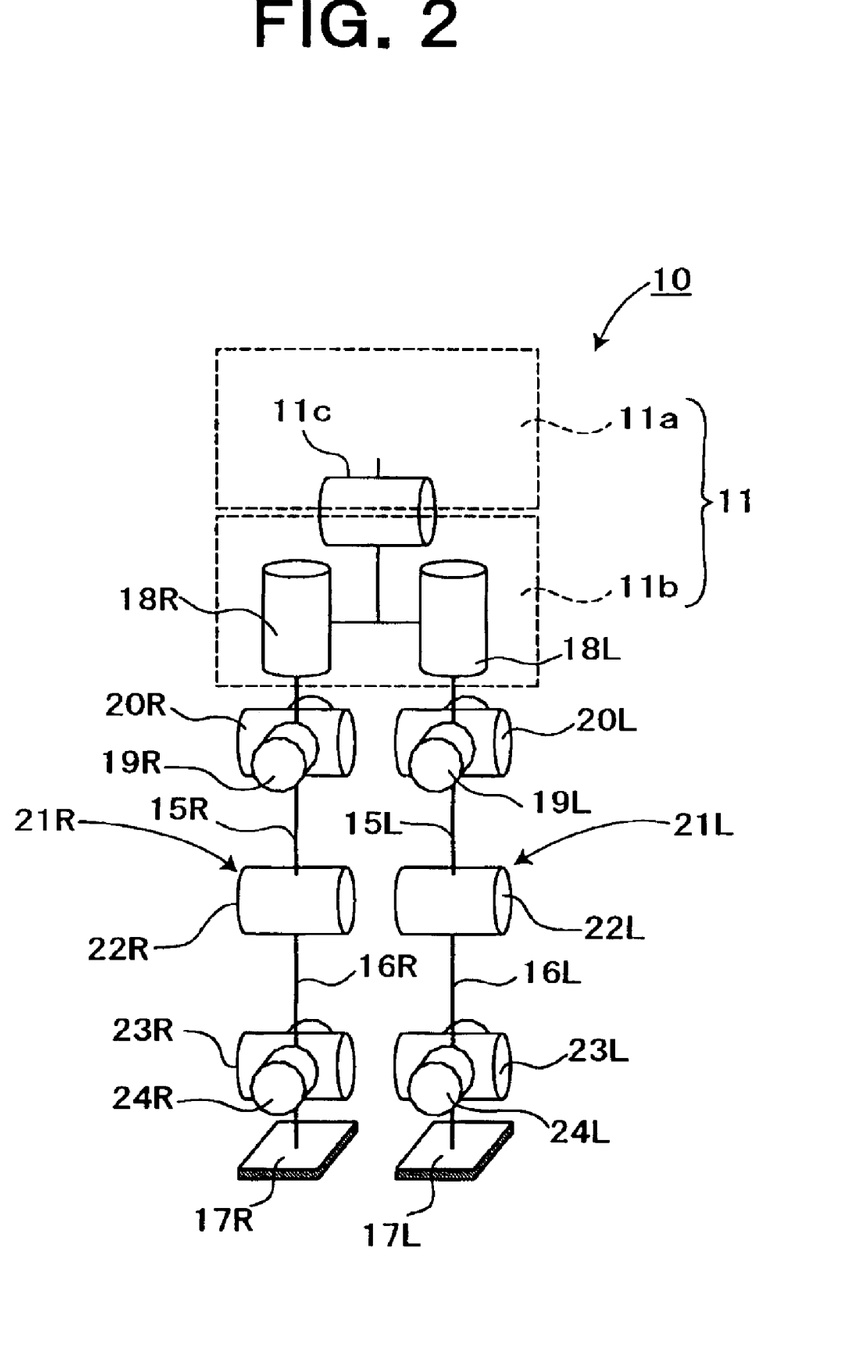
FIG. 2 is a schematic diagram illustrating a mechanical makeup of the biped walking humanoid robot shown in FIG. 1.

FIGS. 1 and 2 show how a biped walking humanoid robot according to the present invention is constructed in one form of implementation thereof. Referring to FIG. 1, the biped walking robot indicated by reference character 10 includes a trunk 11 having a pair of legs 12L and 12R attached to its lower part 11b at a pair of opposite sides thereof, respectively, a pair of arms 13L and 13R attached to its upper part 11a at a pair of opposite sides thereof, respectively, and a head 14 attached to its upper end.

An anteflex region 11c separates the upper and lower parts 11a and 11b of the trunk 11 from each other. The upper trunk part 11a is supported pivotally at the anteflex region 11c so as to be able to swing forth and back and especially to be able to bend forward. The trunk 11 contains a control means to be described later, and the anteflex region 11c is constituted by a joint drive motor in such motors shown in and to be described in connection with FIG. 2.

Each of the legs 12L and 12R is made of an upper leg 15L, 15R, a lower leg 16L, 16R, and a foot 17L, 17R. Here, each of the legs 12L and 12R as shown in FIG. 2 has six (6) joint regions, namely stated in turn from upside, a waist joint region 18L, 18R for turning (pivotally moving) the corresponding leg 12L, 12R relative to the trunk 11, a first hip joint region 19L, 19R for turning the leg about a roll x-axis, a second hip joint region 20L, 20R for turning the leg about a pitch y-axis, a joint region 22L, 22R at a knee 21L, 21R as a junction between the upper leg 15L, 15R and the lower leg 16L, 16R for turning the lower leg about a pitch axis, a first ankle joint region 23L, 23R for turning the foot 17L, 17R about a pitch axis, and a second ankle joint region 24L, 24R for turning the foot 17L, 17R about a roll axis. Each of these joint regions 18L, 18R~24L, 24R is constituted as and by a joint drive motor. It follows, therefore, that the waist/hip joints are constituted by the joints 18L, 18R, 19L, 19R and 20L, 20R while the foot joints are by the joints 23L, 23R and 24L, 24R.

This makeup provides the six (6) degrees of freedom for each of the left and right hand side legs 12L, 12R of the biped walking humanoid robot 10. The robot 10 is thus so configured that if these twelve (12) joint regions are adapted to be driven by the respective drive motors in a controlled manner to make proper angular movements such as to move the legs 12L and 12R properly as a whole, the robot is rendered capable of walking in any way as desired in a three-dimensional space.

Each of the arms 13L and 13R is made of an upper arm 25L, 25R, a lower arm 26L, 26R and a hand 27L, 27R. In each of the upper arm 25L, 25R, the lower arm 26L, 26R and the hand 27L, 27R are each made pivotally movable mono-axially or biaxially as in each of the legs 12L and 12R. Each of the joint regions is constituted as and by a joint drive motor. Given appropriate degrees of freedom in this manner, each of the left and right hand arms 13L and 13R of the biped walking humanoid robot 10 is made movable as desired.

The head 14 which is mounted to the upper end of the upper trunk part 11a of the trunk body 11 is provided with a camera for vision and a microphone for audition.

The biped walking humanoid robot 10 of the invention constructed as mentioned above is essentially the same in makeup as the conventional biped walking humanoid robot but is novel and unique in makeup as mentioned below.

To wit, in the biped walking humanoid robot 10 of the invention as illustrated, each of the upper and lower trunk parts 11a and 11b of the trunk body 11, the upper legs 15L and 15R and the lower legs 16L and 16R of the legs 12L and 12R, and the upper arms 25L and 25R and the lower arms 26L and 26R of the arms 13L and 13R has a curved outer covering surface area that is convex or bulged in outline as shown in FIG. 1 and formed of an impact resistant material such as, for instance, styrofoam.

Figure 3:
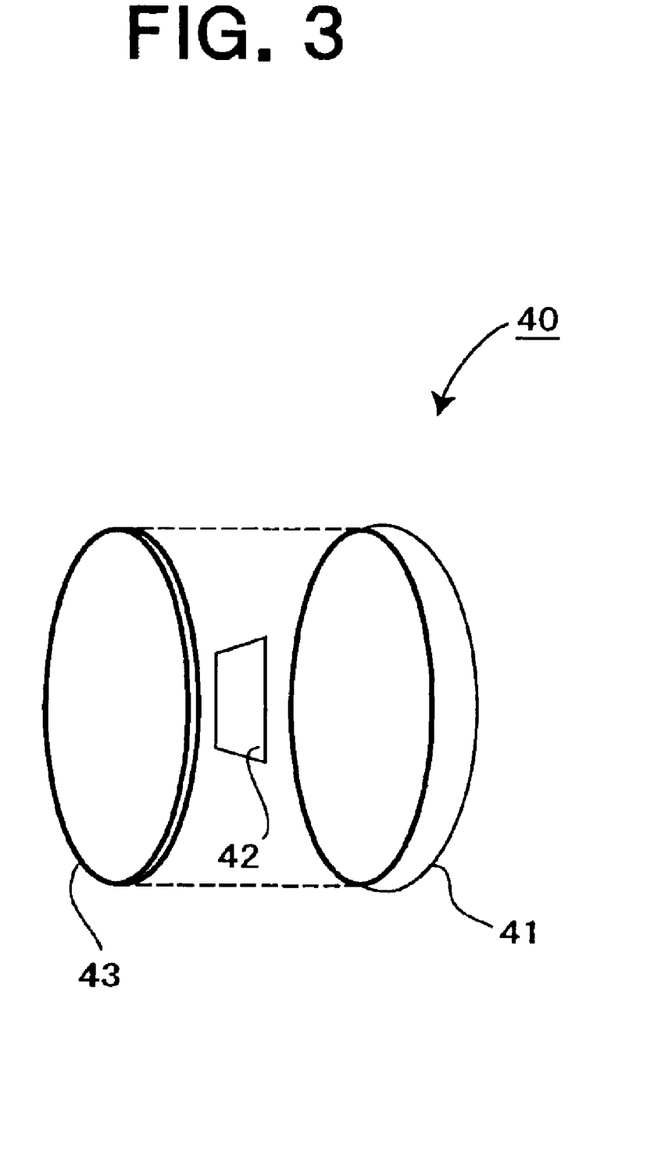
FIG. 3 is an enlarged perspective view illustrating a contact detector as it is decomposed, in the biped walking humanoid robot shown in FIG. 1.

Further in the biped walking humanoid robot 10, each of those portions thereof which can strike against the floor or ground when the robot falls down, namely, an outer area of an elbow 28L, 28R formed between the upper arm 25L, 25R and the lower arm 26L, 26R of each of the arms 13L and 13R, an outer area of a wrist 29L, 29R formed between the lower arm 26L, 26R and the hand 27L, 27R of each of the arms 13L and 13R, a central area of sole, a lower area of toe 30L, 30R and a lower area of heel 31L, 31R of each of the feet 17L and 17R, an outer area of the knee 21L, 21R of each of the legs 12L and 12R, and a surface area in the rear 32 of the lower trunk part 11b and a surface area in the rear 33 of the upper trunk part 11a of the trunk body 11 includes a contact detector 40. The contact detector 40 as shown in FIG. 3 comprises an outer casing portion 41 of a material that constitutes the outer covering surface areas of the robot mentioned above, a pressure sensor 42 disposed inwards of the outer covering portion 41 and an impact absorbing material 43 disposed interiorly of the pressure sensor 42.

Such outer covering portions 41 are convex in contour and formed of an impact resistant material such as, for instance, styrofoam as are the surface areas of the other parts of the robot mentioned above.

The pressure sensor 42 when the biped walking humanoid robot 10 falls down or over is adapted to sense a contact pressure produced upon the corresponding contact detector 40 forcibly coming into contact with the floor or ground to provide a contact sensing signal for the control means or stage to be described later.

The impact absorbing material made, e. g., of sorbothane is designed to absorb a shock which that contact detector 40 may receive from the floor or ground when the biped walking humanoid robot 10 falls down or over.

While the contact detector 40 is shown comprising, from outer to inner, the covering or casing portion 41, the pressure sensor 42 and the impact absorbing material 42, they may be arranged in any order as desired. In this connection it should be noted that disposing the casing portion 41 at the outermost side is advantageous in that when the biped walking humanoid robot 10 falls to cause the contact detector 40 to hit on the floor or ground, the casing 41 comes into direct contact with the floor or ground, thereby protecting the pressure sensor 42, the impact resistant material 43 and further the inner structure of the robot from the shock. Disposing the pressure sensor 42 at the outermost side is advantageous in that when the biped walking humanoid robot 10 falls, the pressure sensor 42 comes into direct contact with the floor or ground, thereby making most certain of sensing the pressure contact of the contact detector 40 with the floor or ground. Disposing the impact absorbing material 43 at the innermost side is advantageous in that when the biped walking humanoid robot 10 falls to cause the contact detector 40 to hit on the floor or ground, the impact absorbing material comes into direct contact with the floor or ground, thereby making for most certain of absorbing the shock.

Also, while the contact detector 40 is shown comprising the casing portion 41, the pressure sensor 42 and the impact absorbing material each separate from another, the casing portion 42 and the impact absorbing material, or the casing portion 41, the pressure sensor 42 and the impact absorbing material 43 may be made integral.

Figure 4:
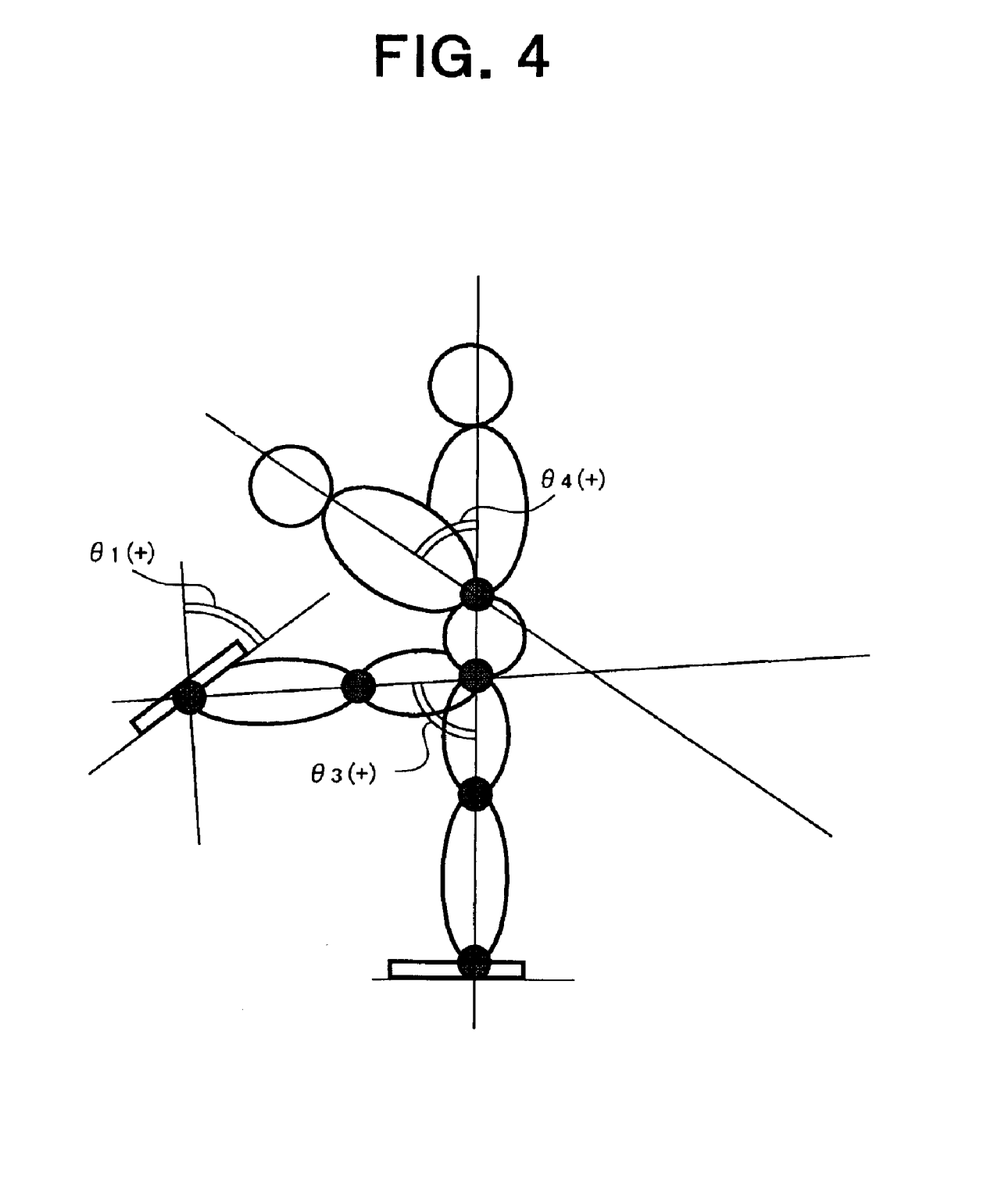
FIG. 4 is a schematic view illustrating respective angular limits of pivotal forward movements of the body portion at an anteflex region, and the upper and lower legs and the foot of each of the legs about their respective joints of the biped walking humanoid robot shown in FIG. 1.
Figure 5:
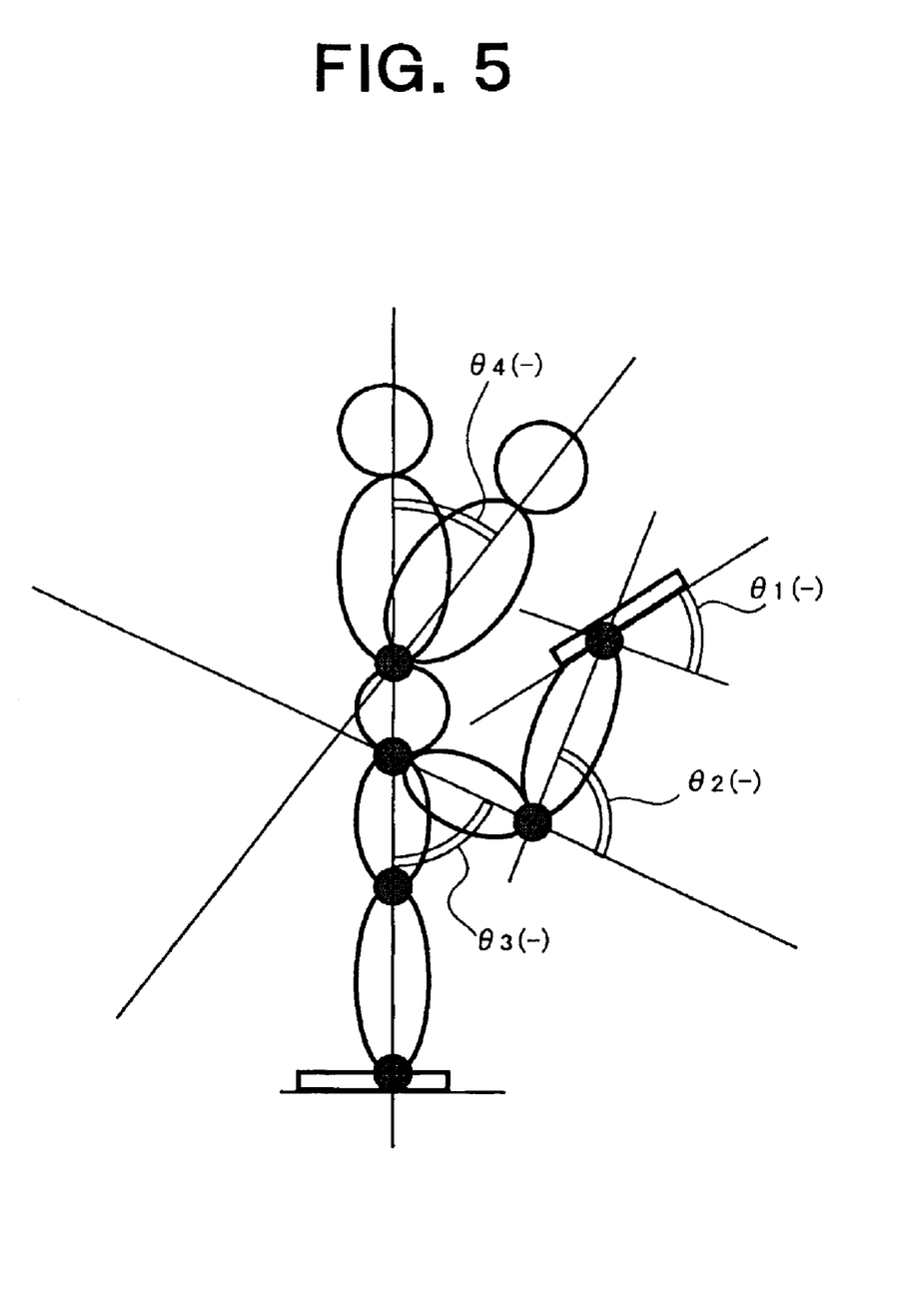
FIG. 5 is a schematic view illustrating respective angular limits of pivotal forward (backward) movements of the body portion at the anteflex region, and the upper and lower legs and the foot of each of the legs about their respective joints of the biped walking robot shown in FIG. 1.

Further in the biped walking humanoid robot 10, the anteflex region 11c of the trunk body 11 and the joints front side back in the legs 12L and 12R, namely the hip joints 20L and 20R, the knee joints 22L and 22R and the ankle joints 23L and 23R are individually made pivotable within angular limits as shown in FIGS. 4 and 5. To wit, the ankle joints 23L and 23R are each made pivotable in a rage of angles θ 1 from −20 to +20 degrees. The knee joints 22L and 22R are each made pivotable in a range of angles θ 2 from 0 to +60 degrees. The hip joints 20L and 20R are each made pivotable in a range of angles θ 3 of 0 to +45 degrees. The anteflex region 11c of the trunk body 11 is each made pivotable in a range of angles θ 4 from 0 to +30 degrees.

Figure 6:
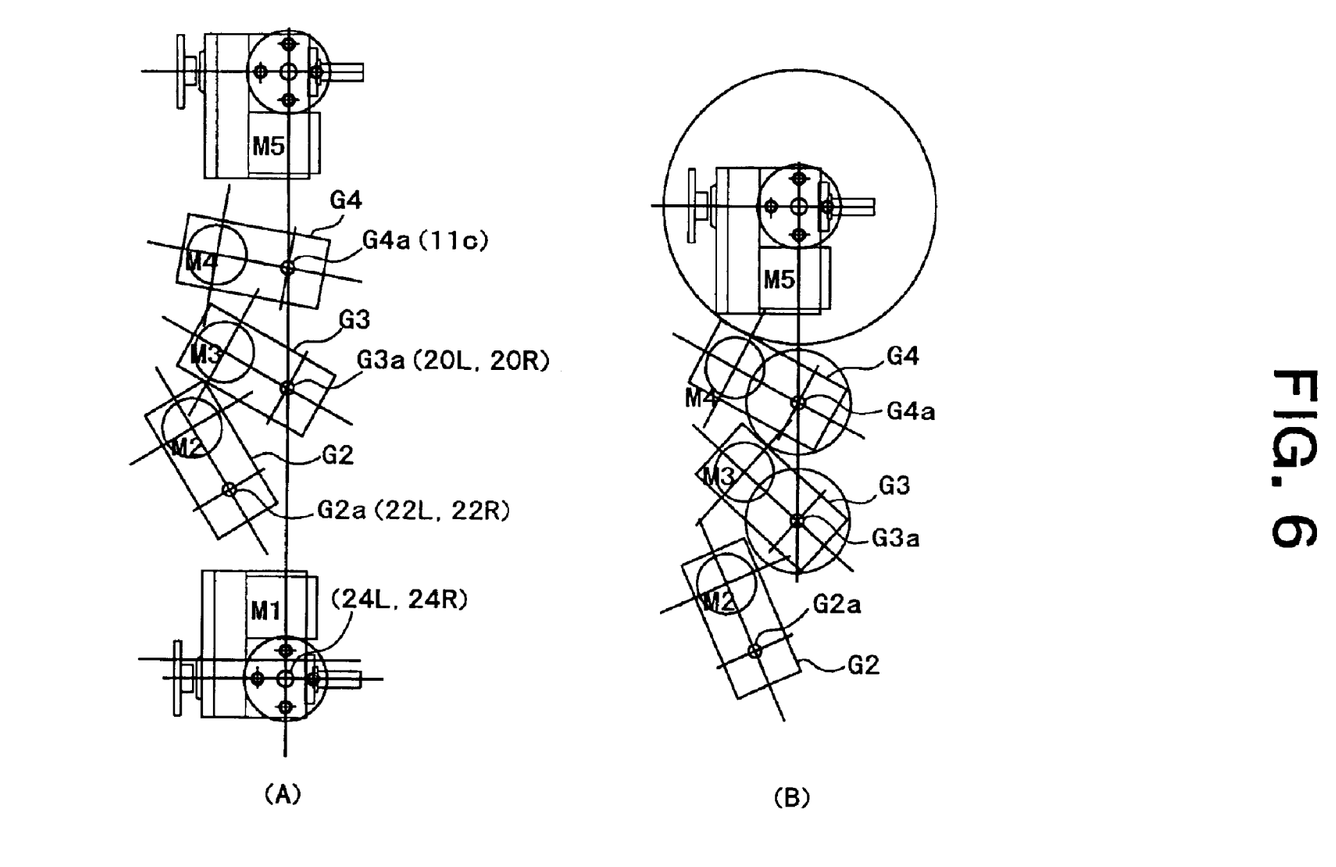

So that the anteflex region 11c and the joints 20L, 20R, 22L, 22R, 23L and 23R may be pivotable in those angular ranges, respectively, joint drive motors are provided for the anteflex region 11c and the joints 20L, 20R, 22L, 22R, 23L and 23R and arranged as shown in FIG. 6. Referring to FIG. 6, the joint drive motors M2, M3 and M4 for the anteflex region 11c and the joints 20L, 20R, 22L, 22R, 23L and 23R have their respective drive shafts coupled via reducers G2, G3 and G4 to their output shafts G2a, G3a and G4a so as to drive the anteflex region 11c and the joints 20L, 20R, 22L, 22R, 23L and 23R, thereby swinging or pivotally moving the upper trunk 11a of the trunk body, 11, the upper legs 15L and 15R, the lower legs 16L and 16R and the feet 17L and 17R about them, respectively. The motors M2, M3 and M4 including the reducers G2, G3 and G4, respectively, are disposed, as shown in FIG. 6A, inclined to one another so as not to hinder the pivotal movements at the anteflex region 11c and the joints 20L, 20R, 22L, 22R, 23L and 23R. This arrangement prevents the motors M2, M3 and M4 as shown in FIG. 6B from interfering with the swing motions or pivotal movements, when effected, at the anteflex region 11c and the joints 20L, 20R, 22L, 22R, 23L and 23R. With motors M2, M3 and M4 so arranged, therefore, without lengthening the legs 12L and 12R to an extent more than needed it is ensured that the anteflex region 11c and the joints 20L, 20R, 22L and 22R can pivot each within a preestablished range of angles as needed. Shown further in FIG. 6 are joint drive motors M1 and M5 for the joints 24L and 24R and the joints 19L and 19R, respectively.

Figure 7:
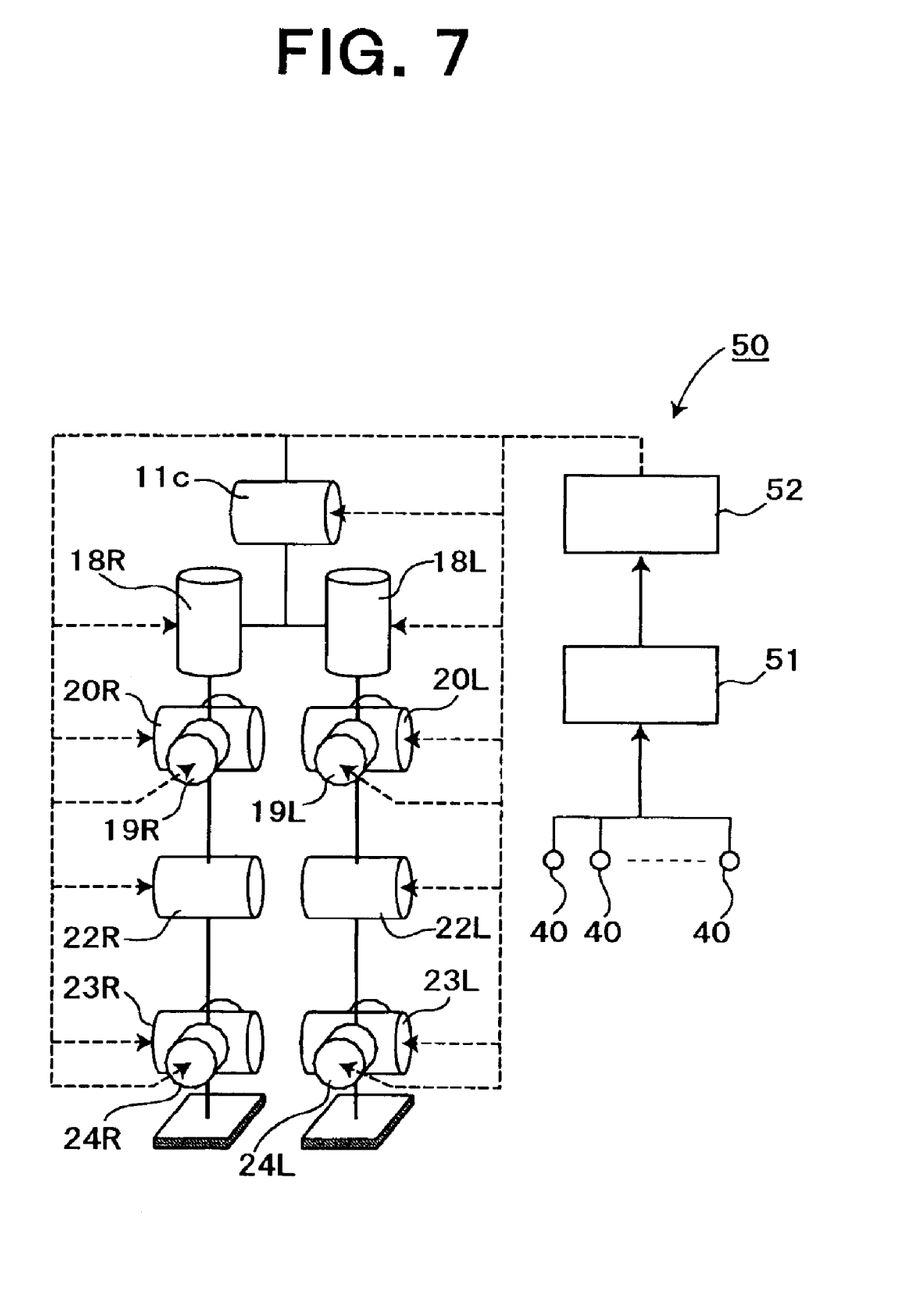
FIG. 7 is a block diagram illustrating an electrical makeup of the biped walking robot shown in FIG. 1.

Referring next to FIG. 7 which shows the electrical makeup of the biped walking humanoid robot shown in FIGS. 1 to 6, there is shown a walk controller 50 for controlling the driving actions of the drive means, namely the drive motors for the anteflex region 11c, and the joints 18L, 18R to 24L and 24R.

The controller 50 comprises a control stage 51 and a motor control unit 52. The control stage 51 is designed to form a control signal for each of the joint drive motors on the basis of a preestablished gait pattern. The motor control unit 52 is designed to drive each of the joint drive motors controllably in accordance with a control signal from the control stage 51. Further, the control stage 51 when the biped walking humanoid robot 10 is falling is so designed that it is responsive to contact sensing signals from the pressure sensors 42 of the contact detectors 40 to determine a type of the fall the robot is then having. The control stage 51 is then designed to form control signals for the joint drive motors so that the robot 10 takes a preestablished safety fall and thereafter a preestablished rising action or motion pattern.

Constructed as mentioned above, the biped walking humanoid robot 10 according to the illustrated form of implementation of the invention is actuated to walk normally when the joint drive motors for the anteflex region 11c, and the joints 18L, 18R to 24L and 24R are controllably driven by the motor control unit 52 furnished with control signals formed at the control stage 51 in the walk controller 50 on the basis of a preestablished gait pattern.

However, the biped walking humanoid robot 10 may become unstable in its walking posture and might then be falling forward. As far as the robot 10 is walking normally as shown in FIG. 8A, the pressure sensor in the contact detector 40 mounted at a center region of the sole of each of the feet 17L and 17R provides a pressure signal for the control stage 51 which in turn judges that the robot is walking stably to allow it to continue to walk.

Figure 8:
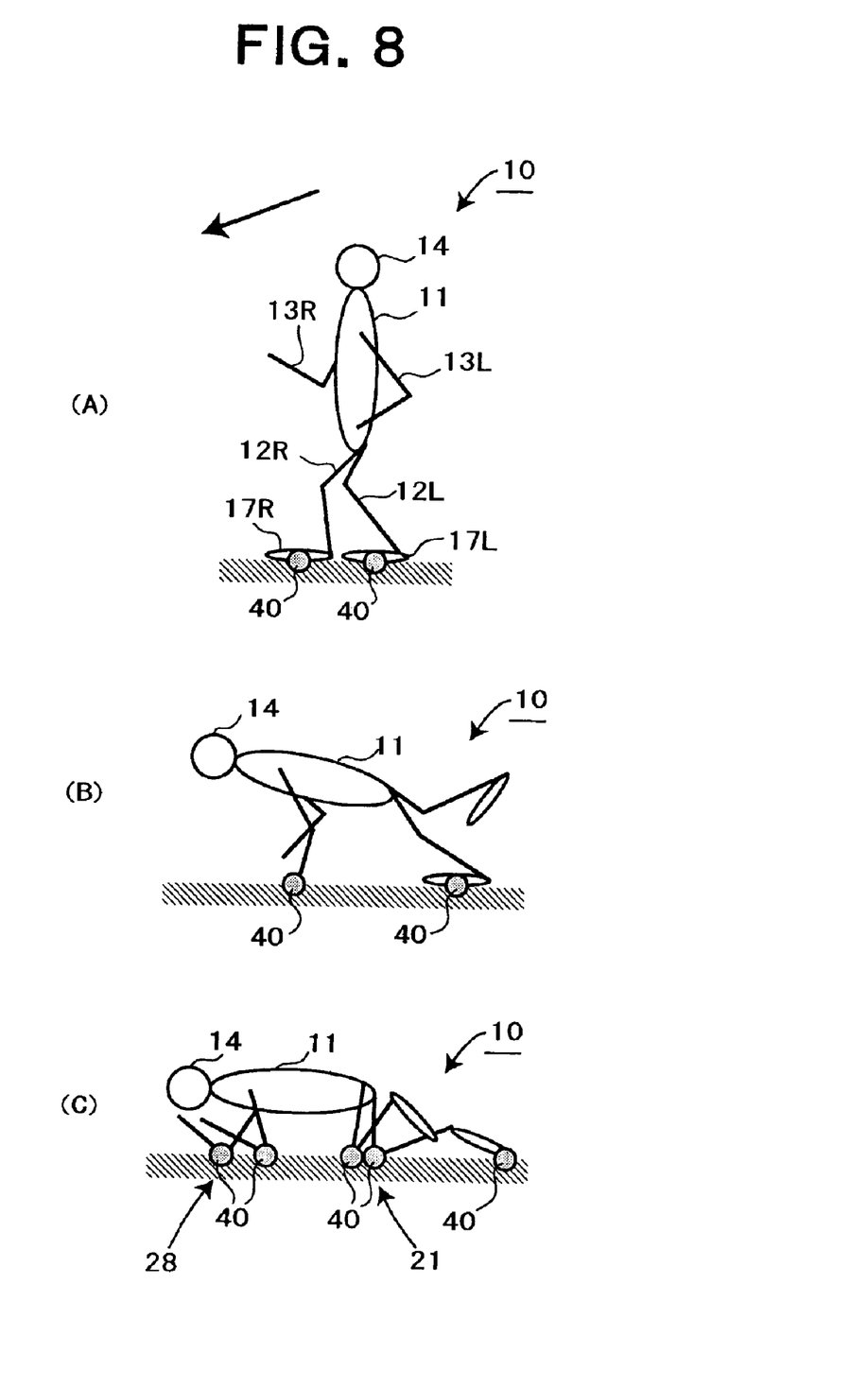
FIG. 8 schematically illustrates the biped walking robot of FIG. 1 having a forward fall and taking a corrective action to have a safety fall, specifically showing the robot before its fall at (A), having the forward fall at (B) and having the safety fall at (C)

If the biped humanoid robot is falling forward as shown in FIG. 8B, the pressure sensor in the contact detector 40 mounted at the wrist 29L, 29R of one of the arms 13L and 13R responds to this and provides a contact signal for the control stage 51 which in turn judges that the robot is falling forward and provides the motor control unit 52 with control signals such as to cause the robot 10 to take a corrective falling action to have a safety fall with both the elbows 28L and 28R and both the knees 21L and 21R on the floor or ground as shown in FIG. 8C. Further, any shock acting on each of the elbows 28L and 28R and the knees 21L and 21R when it hits on the floor or ground is absorbed by the impact absorbing element 43 in the contact detector 40 mounted in each of these robot's parts.

Furthermore, furnished with contact signals from the contact detectors 40 mounted in both elbows 28L and 28R, both knees 21L and 21R and the toe 30L or 30R of one foot 17L or 17R which are all brought into contact with the floor or ground, the control stage 51 can accurately determine an exact posture of the fall the robot 10 has. Hence, it can provide the motor control unit 52 with control signals such as to cause the robot 10 to take a rising action to get up on its feet. Then, provided with its cladding surfaces of the parts individually convex in contour, the robot 10 is allowed to make the successive rising movements smoothly.

The biped walking humanoid robot 10 becoming unstable in its walking posture might also be falling backward. As far as the robot 10 is walking normally as shown in FIG. 9A, the pressure sensor in the contact detector 40 mounted at the center region of the sole of each of the feet 17L and 17R provides a pressure signal for the control stage 51 which in turn judges that the robot is walking stably to allow it to continue to walk.

Figure 9:
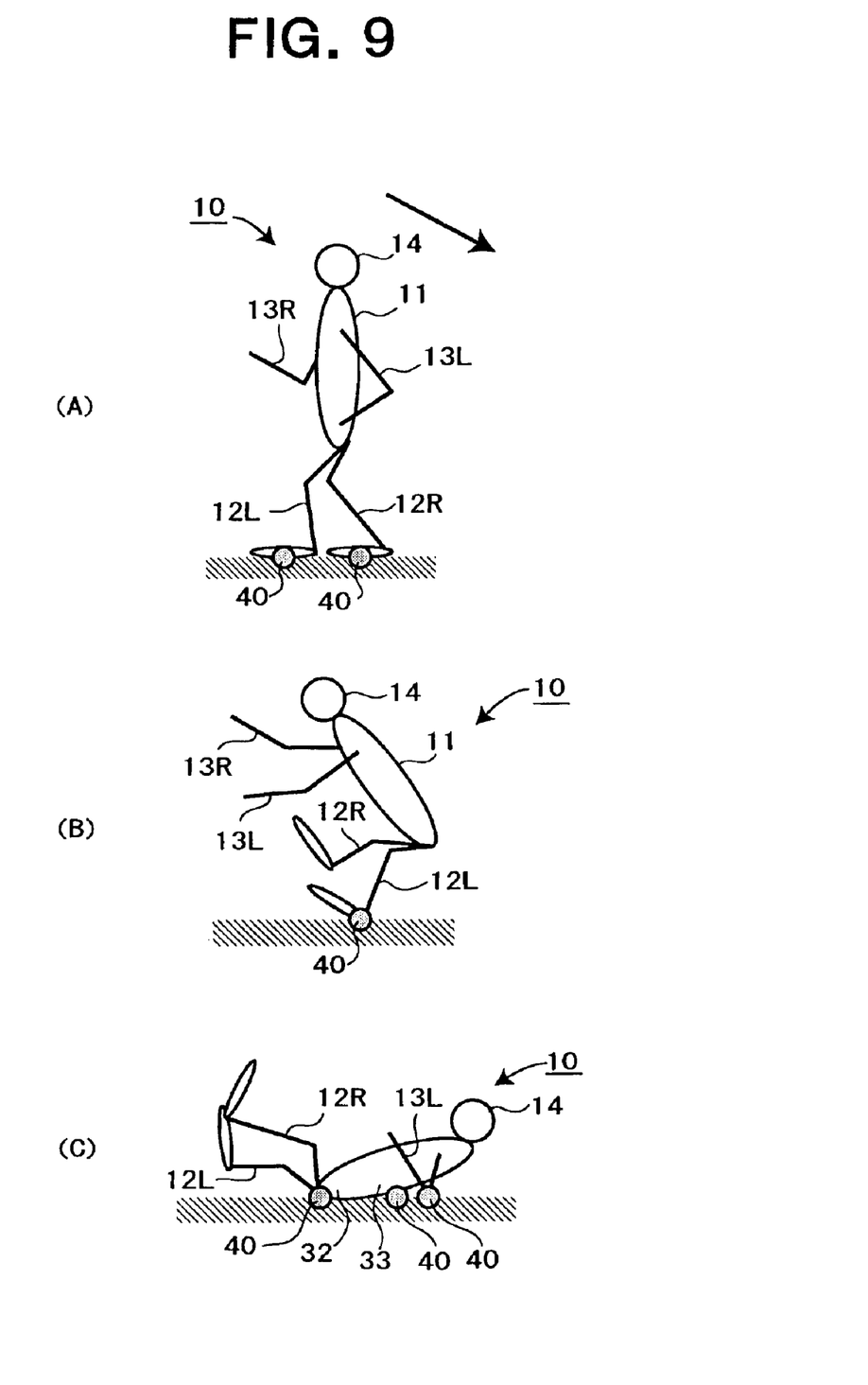
FIG. 9 schematically illustrates the biped walking robot of FIG. 1 having a backward fall and taking a corrective action to have a safety fall, specifically showing the robot before its fall at (A), having the backward fall (B) and having the safety fall (C).

If the biped humanoid robot is falling backward as shown in FIG. 9B, the pressure sensor 42 in the contact detector 40 mounted at the heel 31L, 31R of one of the feet 17L and 17R responds to this and provides a contact signal for the control stage 51 which in turn judges that the robot is falling backward and provides the motor control unit 52 with control signals such as to cause the robot 10 to take a corrective action to have a safety fall with the behind 32, the back 33 and both elbows 28L and 28R on the floor or ground as shown in FIG. 8C. Further, any shock acting on each of the behind 32, the back 33 and both elbows 28L and 28R when it hits on the floor or ground is absorbed by the impact absorbing element 43 in the contact detector 40 mounted in each of these robot's parts.

Furthermore, furnished with contact signals from the contact detectors 40 mounted in the behind 32, the back 33 and both elbows 28L and 28R which are all brought into contact with the floor or ground, the control stage 51 can accurately determine an exact posture of the fall the robot 10 has. Hence, it can provide the motor control unit 52 with control signals such as to cause the robot 10 to take a rising action to get up on its feet. Then, provided with its cladding surfaces of the parts individually convex in contour, the robot 10 is allowed to make the successive rising movements smoothly.

Thus, provided at elbows 28L and 28R, wrists 29L and 29R, the knees 21L, 21R and a center region, heel 31L, 31R and toe 30L, 30R of the sole of each of feet 17L and 17R with contact detectors 40 which permit detecting the posture of a fall that it may have, a biped walking humanoid robot 10 of the present invention as illustrated is allowed to take a corrective falling action to have a safety fall and then to smoothly shift to taking a rising action to get up on the feet, the corrective falling and rising actions meeting with the falling posture detected. Further, given the ability to grasp the posture of its fall, a biped walking humanoid robot 10 of the invention as illustrated is even capable of performing a forward and a backward roll in the course that it is falling to rise on its feet.

While in the foregoing description mention is not made of how the arms 13L and 13R should be moved when the robot is taking a corrective falling and a rising action, it should be obvious that they may then be moved in any suitable way.

INDUSTRIAL APPLICABILITY

There is provided in accordance with the present invention a biped walking humanoid robot in which a contact detector having an impact absorbing material is disposed at each of those parts of the robot which can hit on the floor or ground when the robot is falling down to or rolling over it, namely, at each of an outer area of an elbow portion formed between the upper and lower arm portions, and an outer area of a wrist portion formed between the lower arm portion and the hand portion of each of the arm portions, and a lower side of a toe formed in the foot portion, a lower side of a heel portion formed in the foot portion, and an outer area of a knee portion formed between the upper and lower leg portions of each of the leg portions, and a hip region and a back region of the body portion whereby any shock acting on any of these parts hitting on the floor or ground can be absorbed by the impact absorbing material. With the shock against the internal structure of each of these parts so alleviated, they are protected from any possible damage that should otherwise be the case when the biped walking humanoid robot happens to fall to or is attempting to perform a rolling action over the floor or ground.

And, when the biped walking humanoid robot is having a fall, the state or type of this fall can be determined by a control means in response to a contact signal detected by the pressure sensor in the contact detector at a relevant part of the abovementioned robot parts which is brought into contact with the floor or ground. Then, on the basis of the type of the fall determined, the control means is allowed to act on the drive means to move the arm and leg parts suitably so as to cause the robot to take a corrective falling action to have a safety fall and then to move to taking a rising action to get up on its feet.

There is thus provided a biped walking humanoid robot which so eminently excels that shocks acting on various parts of the robot when it falls can be relieved and its state or type of fall can then be detected.

What is claimed is:

1. A biped walking humanoid robot, comprising:
 a body portion having an upper and a lower part, a pair of leg portions attached to the lower part of the body portion at a pair of its opposite sides, respectively, a pair of arm portions attached to the upper part of the body portion at a pair of its opposite sides, respectively, and a head portion attached to an upper end of the upper part of the body portion,
 wherein each of the leg portions includes two upper leg portions attached to the lower part of the body portion so as to be pivotally movable relative thereto triaxially, a lower leg portion attached to the upper leg portion so as to be pivotally movable relative thereto monoaxially, and a foot portion attached to the lower leg portion so as to be pivotally movable relative thereto biaxially,
 wherein each of the arm portions includes two upper arm portions attached to the upper part of the body portion so as to be pivotally movable relative thereto biaxially, a lower arm portion attached to the upper arm portion so as to be pivotally movable relative thereto monoaxially, and a hand portion attached to the lower arm portion so as to be pivotally movable relative thereto biaxially,
 wherein the body portion has an intermediate, anteflex region at which it is made able to bend forward; and
 wherein the robot further comprises a drive means for pivotally moving each of the foot portion, the lower leg portion and the upper leg portion of each of the leg portions, and the hand portion, the lower arm portion and the upper arm portion of each of the arm portions, and the body portion at the anteflex region, and a control means for controlling driving actions of the drive means;
 the robot being characterized in that:
 there is provided a contact detector at each of an outer area of an elbow portion formed between the upper and lower arm portions, and an outer area of a wrist portion formed between the lower arm portion and the hand portion of each of said arm portions, and a lower side of a toe portion formed in the foot portion, a lower side of a heel portion formed in the foot portion, and an outer area of a knee portion formed between the upper and lower leg portions of each of said leg portions, and a hip region and a back region of said body portion, and
 said contact detector comprises a casing portion forming an outer covering surface of the robot at said contact detector, a pressure sensor for sensing a pressure acting on said casing portion and an impact absorbing material for relieving a shock acting on said casing portion,
 wherein the control means determines a state, based on signals from each of the contact detectors, that the robot is falling.

2. A biped walking humanoid robot as set forth in claim 1, characterized in that in each of such contact detectors said pressure sensor and said impact absorbing material are integrally formed.

3. A biped walking humanoid robot as set forth in claim 1, characterized in that in each of such contact detectors said casing portion, said pressure sensor and said impact absorbing material are formed integrally.

4. A biped walking humanoid robot as set forth in claim 1, characterized in that in each of such contact detectors said casing portion lies at an outermost side thereof.

5. A biped walking humanoid robot as set forth in claim 1, characterized in that in each of such contact detectors said pressure sensor lies at an outermost side thereof.

6. A biped walking humanoid robot as set forth in claim 1, characterized in that in each of such contact detectors said impact absorbing material lies at an outermost side thereof.

7. A biped walking humanoid robot as set forth in claim 1, characterized in that each of said body portion, the upper and lower arm portions of said arm portions, and the upper and lower leg portions of said leg portions has a curved outer covering surface that is convex in contour.

8. A biped walking humanoid robot as set forth in claim 1, characterized in that:

for each of said leg portions said foot portion is made pivotally movable relative to said lower leg portion in a pitch direction in a range of angles from −20 to +20 degrees or more, said lower leg portion is made pivotally movable relative to said upper leg portion in a pitch direction in an range of angles from 0 to +60 degrees or more, and said upper leg portion is made pivotally movable relative to said body portion in a pitch direction in a range of angles from 0 to +45 degrees or more, and said body portion is made able to bend forward in a range of angles from 0 to +30 degrees or more.

9. A biped walking humanoid robot as set forth in claim 1, characterized in that those of said drive means for pivotally moving the foot portion, the lower leg portion and the upper leg portion of each of said leg portions, respectively, are disposed inclined to one another so as not to hinder pivotal movements of said foot portion, said upper leg portion and said lower leg portion.

10. A biped walking humanoid robot as set forth in claim 1, characterized in that the control means generates control signals of each drive means so that the robot takes a preestablished safety fall and thereafter a preestablished rising action or motion pattern.

* * * * *